United States Patent [19]

Förster et al.

[11] 4,050,556
[45] Sept. 27, 1977

[54] AUTOMATIC TRANSMISSION WITH RETARDER

[75] Inventors: Hans-Joachim M. Förster, Stuttgart-Riedenberg; Ulrich Eltze, Esslingen-Liebersbronn, both of Germany

[73] Assignee: Daimler-Benz Aktiengesellschaft, Germany

[21] Appl. No.: 558,163

[22] Filed: Mar. 13, 1975

Related U.S. Application Data

[63] Continuation of Ser. No. 305,279, Nov. 10, 1972, abandoned.

[30] Foreign Application Priority Data

Nov. 11, 1971 Germany .................................. 2156002

[51] Int. Cl.² .......................................... B60K 41/26
[52] U.S. Cl. ................................................. 192/4 B
[58] Field of Search ............ 192/4 R, 4 A, 4 B, 12 A; 74/865

[56] References Cited

U.S. PATENT DOCUMENTS

| 2,119,247 | 5/1938 | Scott | 74/395 |
|---|---|---|---|
| 2,148,326 | 2/1939 | Siekmann | 192/4 B |
| 2,419,637 | 4/1947 | Gabriel et al. | 322/32 X |
| 3,124,218 | 3/1964 | Montgomery | 188/274 |
| 3,334,711 | 8/1967 | Anderson | 192/4 B X |
| 3,363,728 | 1/1968 | Stengelin et al. | 192/4 B X |
| 3,572,480 | 3/1971 | Nagel | 192/4 B |

FOREIGN PATENT DOCUMENTS

| 197,189 | 7/1965 | Sweden | 192/4 B |

Primary Examiner—Samuel Scott
Assistant Examiner—Lance W. Chandler
Attorney, Agent, or Firm—Craig & Antonelli

[57] ABSTRACT

A transmission with a retarder as additional, preferably as third brake, especially an automatic transmission for motor vehicles in which the retarder is arranged on the output side of the transmission and the various transmission ratios of the transmission are engaged by way of free-wheeling devices which continuously remain in their operable position during the actuation of the retarder.

86 Claims, 5 Drawing Figures

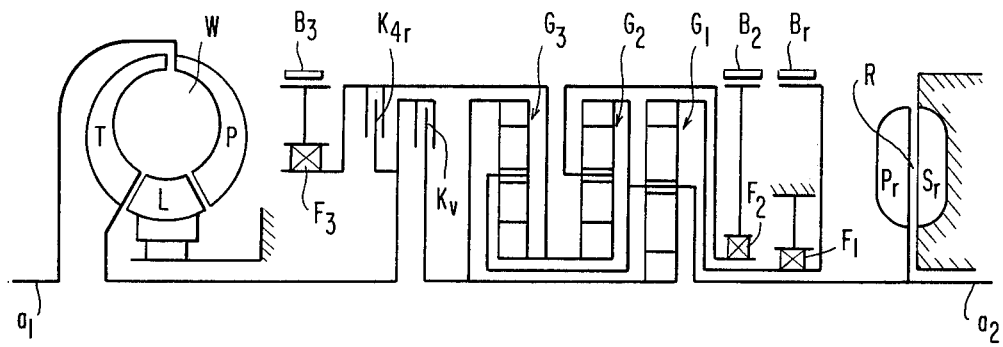
FIG.1
FIG.2
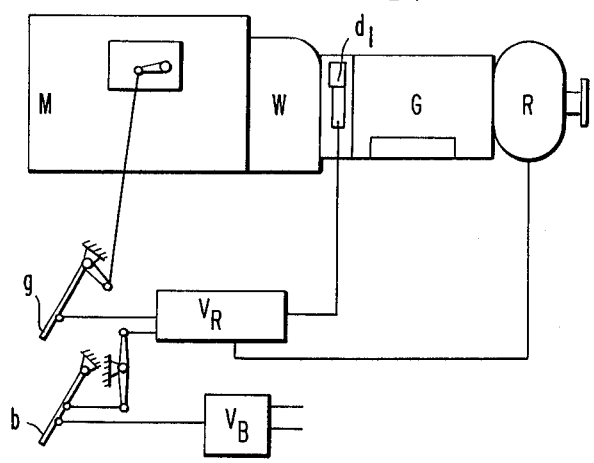
FIG.3
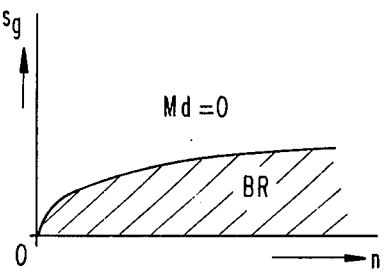
FIG.4
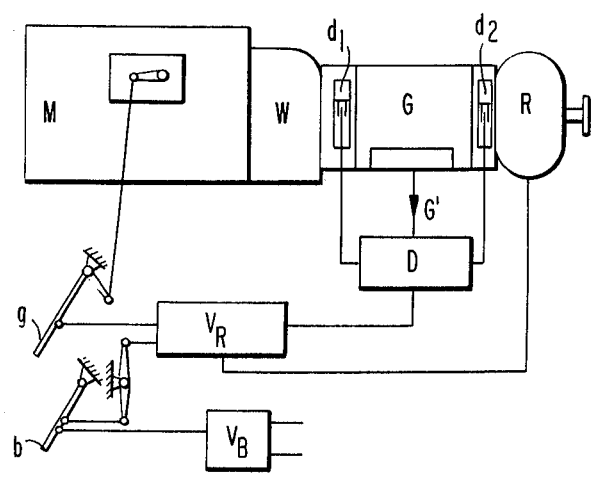
FIG.5
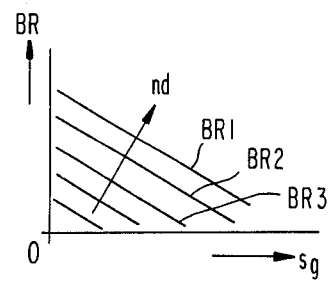

AUTOMATIC TRANSMISSION WITH RETARDER

This is a continuation, of application Ser. No. 305,279 filed Nov. 10, 1972, now abandoned. The present invention relates to a transmission with a retarder as additional (preferably third) brake, especially to an automatic transmission for motor vehicles.

With heavy vehicles, especially with trucks, in view of the fact that the wheel brakes are overloaded and the engine brake—in addition to foot and hand brakes—does not suffice alone as third brake, additional so-called retarders are increasingly used which as a rule are constructed as hydraulic or electric brake. Added thereto is the fact that in vehicles with gas turbines as power engines, a braking effect of the gas turbine is attainable only by additional expenditures.

It is the aim of the present invention above all to enable a simplification in the actuation as well as also in the construction of transmission-retarder arrangements of above-mentioned type. Accordingly, the present invention from the start abandons the braking effect of the driving engine and essentially consists in that with a retarder arranged on the output side of the transmission, the transmission ratios or speeds of the transmission are shifted by way of free-wheeling devices which remain constantly in their operative or effective positions also with the actuation of the retarder. Consequently, all speeds or transmission ratios can support or brace themselves by way of the free-wheeling devices so that no additional shifting devices or elements are required for by-passing the free-wheeling devices. The transmission thereby becomes more simple in construction and also more simple and more complete in the actuation.

The present invention is of advantage in particular for such types of automatic transmissions in which the speeds of the transmission are shifted by way of planetary gears adapted to be shifted or engaged by brakes whereby the free-wheeling devices are arranged between the planetary gear and the respectively coordinated brake. The retarder itself is constructed preferably as hydraulic or flow brake or also as electric brake for braking the transmission output against a relatively fixed or stationary part. The engagement and disengagement of a retarder constructed as flow or hydraulic brake can take place by filling and emptying of the hydraulic brake.

The retarder can be controlled by an additional actuating member which is actuated, for example, by hand or by foot, or also by an actuating member which is already present for other purposes and which influences the vehicle drive. Thus, an advantageous possibility of the retarder shifting system resides in that the retarder is actuated along by an actuating member, for example, by the brake pedal of the wheel brake which actuates an already present vehicle brake, especially the foot brake. The retarder and the vehicle brake can be connected thereby to the actuating member in such a manner that upon actuation thereof at first the actuation of the retarder and only thereafter the actuation of the vehicle brake commences. The vehicle brake, especially the wheel brake can be effectively relieved thereby—similar as with the use of an engine brake—which is of particular advantage especially for downhill drives in mountains.

Another particularly preferred type of the connection of the retarder to the remaining drive control system resides in that the retarder is actuated along by the accelerating member (called hereinafter for brevity's sake "gas pedal") of the driving engine. The gas pedal can be converted thereby into a type of single lever actuation for the drive and the braking because in the released condition, it can correspond to the full engagement of the brake.

In particular, for example, the control mechanism of the retarder can be connected with the control member of the driving engine in such a manner that when dropping below a position of the engine control member corresponding to the driving torque zero, the retarder is additionally engaged. This can be attained, for example, in that the gas pedal has a center zero position from which an actuation in one direction (stepping-through) effects an acceleration (giving gas) while an actuation in the other direction (releasing) effects a braking by the retarder.

Another possibility of the actuation of the retarder consists in that the retarder is rendered operative when the drive is interrupted or the torque transmission by the engine decreases to or nearly to zero. The retarder can also be controlled, on the one hand, by the stroke or travel of the accelerating member (gas pedal) and, on the other, by the engine rotational speed. In particular, the control can take place also in dependence on the push-pull-change in the vehicle drive which can be detected, for example, by the difference in the rotational speed of the pump and the turbine wheel of a hydraulic transmission, by the support moment in the transmission or the like; for example, also in that the retarder is controlled by rotational speed comparison between input and output, i.e., in dependence on the difference rotational speed, with a speed or transmission ratio disengaged by the free-wheeling device or by the magnitude of the rotational speed difference at the free-wheeling device of the engaged speed or transmission ratio.

Factors dependent on the driving condition or influencing the driving condition which are combined at will in any other suitable manner, can also be utilized for the control of the retarder. Also, for example, the control of the retarder by the gas pedal can take place only up to a limited effect or up to a predetermined limited value. Possibly, however, for the full effectiveness of the retarder, a further control by means of a further actuating member, especially the brake actuating member or the like may be provided.

Moreover, for special operating conditions, the possibility of an additional interaction or engagement may be provided which renders the magnitude of the maximum braking, when releasing the gas pedal, dependent on the vehicle velocity or on another freely selectable magnitude. Such an interaction or engagement can take place by the driver and/or also automatically.

Accordingly it is an object of the present invention to provide a transmission with a retarder, espcially an automatic transmission for motor vehicles, which avoids by simple means the aforementioned shortcomings and drawbacks encountered in the prior art.

Another object of the present invention resides in a transmission with a retarder which greatly simplifies both actuation and construction thereof.

A further object of the present invention resides in a change-speed transmission with retarder for motor vehicles in which all speeds of the transmission can support themselves by way of conventional free-wheeling devices so that no additional shifting devices and elements are necessitated for by-passing the free-wheeling devices.

A further object of the present invention resides in a motor vehicle transmission with a retarder of the type described above which offers great versatility in the control of the retarder, yet permits a simple construction assuring reliable operation under all driving conditions.

These and other objects, features and advantages of the present invention will become more apparent from the following description when taken in connection with the accompanying drawing which shows, for purposes of illustration only, two embodiments in accordance with the present invention, and wherein:

FIG. 1 is a schematic over-all view of a four-speed transmission with a retarder in accordance with the present invention which transmission operates, for example, automatically;

FIG. 2 is a schematic view for the actuation of the retarder in dependence on the engine torque and the gas pedal travel in accordance with the present invention;

FIG. 3 is a diagram explanatory of the actuating system of FIG. 2;

FIG. 4 is a schematic view for an actuation of the retarder, inter alia, in dependence on the difference in rotational speed between input and output in accordance with the present invention; and FIG. 5 is a diagram explanatory of the actuating system of FIG. 4.

Referring now to the drawing wherein like reference numerals are used throughout the various views to designate like parts and more particularly to FIG. 1, the input shaft driven by a driving engine (not shown) is designated in this figure by reference character $a_1$, and a torque converter by reference character W which includes a pump wheel P, a turbine wheel T, and a guide wheel L. Reference characters $G_1$, $G_2$ and $G_3$ further designate in FIG. 1 the planetary gear for a first, second and third speed while reference character $K_v$ designates a clutch for the forward speeds, reference character $K_{4r}$ a clutch for the fourth and reverse speed, reference character $B_r$ a brake for reverse speed reference characters $B_2$ and $B_3$ brakes for the second and third speed while the free-wheeling devices associated therewith are designated by reference character $F_1$ for the first speed, by reference character $F_2$ for the second speed and by reference character $F_3$ for the third speed. The retarder R, arranged at the output shaft $a_2$ includes a pump wheel $P_r$ and a relatively stationary or fixed wheel Shd r.

By reason of the retarder R being disposed on the output side of the transmission, the free-wheeling devices $F_1$, $F_2$ and $F_3$ may be continuously in their operable or effective position, i.e., may be provided without a means for by-passing the free-wheeling device. The engagement and disengagement of the retarder is realized appropriately by filling and emptying its flow circulatory system. The actuation of the clutches $K_v$ and $K_{4r}$ can take place in any suitable manner, for example, mechanically or hydraulically.

Of course, the retarder can also be used in combination with a transmission of any number of speeds of any known construction as well as with a transmission which does not operate by means of planetary gears.

In the schematic view according to FIG. 2, the driving engine, for example, of a motor vehicle is designated by reference character M, while the torque converter is again designated by reference character W, the transmission by reference character G and the retarder by reference character R.

By means of the brake pedal b, the brake is actuated by way of a brake valve $V_B$ and, the retarder R is actuated by way of a control device, for example, by way of a conventional control valve $V_R$, for example, as disclosed in U.S. Pat. No. 3,124,218. Simultaneously, the accelerator pedal (gas pedal) g, which controls the fuel supply to the engine M can act on the retarder R by way of the control device $V_R$. Additionally, the actuation of the retarder R is influenced by a rotational speed controller $d_1$ of conventional construction which acts on the control of the retarder as a function of the engine rotational speed. The rotational speed controller $d_1$ may thereby be, for example, a centrifugal governor. The engine rotational speed and the gas pedal may thereby control the retarder R—also independently of any influencing by the brake pedal b —in such a manner that after the decrease of the torque output to zero, the braking starts by means of the retarder R.

In FIG. 3, the gas pedal path or travel $s_g$ is plotted as a function of the engine rotational speed $n$, possibly also of the rotational speed of the torque converter turbine wheel. A curve corresponding to FIG. 3 results for the engine torque zero. If one falls below this curve when taking back or releasing the gas pedal g, then depending on the engine rotational speed $n$, an actuation of the retarder takes place corresponding to the cross-hatched brake area BR.

In the example of application of the present invention illustrated schematically according to FIG. 4, the control of the retarder R takes place, on the one hand, in dependence on the gas pedal g and on the brake pedal b and, on the other, in dependence of a difference rotational speed controller D of conventional construction for example, a speed controller arrangement such as disclosed in U.S. Pat. Nos. 2,119,247 and 2,419,637. The difference speed controller D responds to the difference rotational speed $n_d = n_2 . - n_1$ wherein $n_d$ equals differential speed at the output of the speed controller D; $n_1$ equals speed at $d_1$; $n_2$ equals speed at $d_2$; and $i$ equals respective transmission ratio of the speed coordinator or gear system of the speed controller D. The difference rotational speed results after the release of the free wheeling device compared to the gripping or holding of the free-holding device, with incorporation of a consideration of the speed or transmission ratio jump of the engaged speed.

In application to the embodiment according to FIG. 1, the retarder R is not utilized in the uppermost direct speed, unless an additional free-wheeling device is installed in series with the direct speed clutch $K_{4r}$.

The brake force of the retarder BR is plotted in the diagram according to FIG. 5 as a function of the gas pedal path $s_g$. As illustrated by the straight lines $BR_1$, $BR_2$, etc., the brake force exerted thereby by the retarder R increases with the taking back or release of the gas pedal $s_g$. The brake force is thereby the larger, the greater the difference in rotational speed between output and input whereby the straight line $BR_1$ is valid for a relatively large difference in rotational speed whereas the curves parallel thereto which approach the zero point O, such as, $BR_2$, $BR_3$, etc. correspond to smaller rotational speed differences.

While we have shown and described two embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What we claim is:

1. A transmission arrangement for vehicles having a driving engine, the arrangement characterized in that a transmission is provided, the transmission includes an input means output means, and shifting means for selectively engaging the speeds of the transmission including free-wheeling means, in that a retarder means is provided and serves as an additional brake, the retarder means being disposed on the output side of the transmission, in that control means are provided for controlling the braking moment of the retarder means in dependence upon the magnitude of the rotational speed at the free-wheeling means of the engaged speed, and in that the free-wheeling means remain operable constantly with actuation of the retarder means.

2. A transmission arrangement according to claim 1, characterized in that the transmission is an automatic transmission for motor vehicles.

3. A transmission arrangement according to claim 2, characterized in that the retarder means constitutes a third brake for the motor vehicle.

4. A transmission arrangement according to claim 1, characterized in that the transmission further includes planetary gear means whose speeds can be selectively engaged by selectively engageable brake means, the free-wheeling means being arranged between the planetary gear means and the associated brake means.

5. A transmission arrangement according to claim 4, characterized in that the retarder means is constructed as hydraulic brake for braking the transmission output at a relatively fixed part.

6. A transmission arrangement according to claim 5, characterized in that an additonal actuating member is provided for engaging the retarder means.

7. A transmission according to claim 5, characterized in that a manually operable additional actuating means is provided for actuating the retarder means.

8. A transmission arrangement according to claim 5, characterized in that a foot-operated additional actuating means is provided for actuating the retarder means.

9. A transmission arrangement according to claim 5, characterized in that a member already present for other purposes and influencing the vehicle drive actuates the retarder means.

10. A transmission arrangement according to claim 9, characterized in that said member present for other purposes and influencing the vehicle drive is an actuating member.

11. A transmission arrangement according to claim 9, characterized in that said member present for other purposes and influencing the vehicle drive is a control member.

12. A transmission arrangement according to claim 9, characterized in that an actuating member for actuating a vehicle brake actuates the retarder means.

13. A transmission arrangement according to claim 12, characterized in that the brake actuating member is a brake pedal for a wheel brake.

14. A transmission arrangement according to claim 12, characterized by connecting means for connecting the retarder means and vehicle brake to the brake actuating member that upon actuation of the latter at first the actuation of the retarder means commences and thereupon the actuation of the vehicle brake.

15. A transmission arrangement according to claim 9, characterized in that an engine control member actuates the retarder means.

16. A transmission arrangement according to claim 15, characterized in that said engine control member is the accelerating member of the driving engine.

17. A transmission arrangement according to claim 15, characterized in that the engine control member is the gas pedal of the driving engine.

18. A transmission arrangement according to claim 1, characterized in that engine control means for controlling the driving engine are provided, and the control means for the retarder means are operatively connected with the driving engine control means in such a manner that the retarder means is engaged when the engine control means drops below a position corresponding to a driving torque zero.

19. A transmission arrangement according to claim 18, characterized in that the transmission is an automatic transmission for motor vehicles.

20. A transmission arrangement according to claim 18, characterized in that the engine control means includes an actuating member having a center zero position, from which an actuation of said member in one direction effects an acceleration while an actuation of said member in the other direction effects a braking by the retarder means.

21. A transmission arrangement according to claim 20, characterized in that the actuating member is an engine control member.

22. A transmission arrangement according to claim 20, characterized in that the accuating member is an accelerating member.

23. A transmission arrangement according to claim 21, characterized in that the braking moment of the retarder means is controlled substantially proportional to the travel of the engine control member when the latter moves below a position corresponding to a zero driving torque.

24. A transmission with a retarder means as additional brake, characterized in that the transmission includes an input means and output means, in that the retarder means is arranged on the output side of the transmission, and in that shifting means are provided for selectively engaging the speeds of the transmission by way of free-wheeling means remaining operable constantly also with actuation of a retarder means, and in that control means for the retarder means are provided and operatively connected with control means of a driving engine in such a manner that the retarder means is engaged when the engine control means drops below a position corresponding to a driving torque zero, the engine control means including an actuating member having a center zero position, from which an actuation of said member in one direction effects an acceleration while an actuation of said member in the other direction effects a braking by the retarder means, and in that the actuating member is an engine control member, and the braking moment of the retarder means is control led substantially proportional to the travel of the engine control member when the latter moves below a position corresponding to a zero driving torque, and characterized in that the braking moment of the retarder means is controlled in dependence on the magnitude of the rotational speed difference at the free-wheeling means of the engaged speed.

25. A transmission according to claim 24, characterized in that the rotational speed difference is determined from the input and output rotational speed of the transmission, taking into consideration the transmission ratio.

26. A transmission according to claim 25, characterized in that the braking moment of the retarder means is controllable only up to a predetermined limit value.

27. A transmission according to claim 26, characterized in that with engagement and control of the retarder means by an actuating member present already for other purposes, the braking torque of the retarder means is controllable by said actuating member above the mentioned limit value.

28. A transmission according to claim 27, characterized in that the actuating member is a control member.

29. A transmission according to claim 27, characterized in that the control member is a brake actuating member.

30. A transmission according to claim 27, characterized in that the retarder means is controlled, on the one hand, by the travel of the engine control member and on the other, by the engine rotational speed.

31. A transmission according to claim 30, characterized in that the retarder means is additionally controlled by the brake actuating member.

32. A transmission according to claim 27, characterized in that with a hydraulic unit combined with the transmission, the retarder means is controlled by rotational speed comparison as a function of rotational speed difference between pump and turbine wheel of the hydraulic unit.

33. A transmission according to claim 32, characterized in that the control of rotational speed comparison is an additional control.

34. A transmission according to claim 27, characterized in that the retarder means is controlled by the support moment of the driving engine exerted on bearing support means.

35. A transmission according to claim 34, characterized in that the retarder means is controlled by a decreasing support moment exerted on the bearing support means.

36. A transmission according to claim 34, characterized in that the retarder means is controlled by an interruption in the support moment exerted on the bearing support means.

37. A transmission according to claim 34, characterized in that the last-mentioned control is an additional control.

38. A transmission arrangement according to claim 18, characterized in that the control of the retarder means by the engine control means takes place only up to a limited value and a further control by a further actuating member takes place for the full effect of the retarder means.

39. A transmission arrangement according to claim 38, characterized in that said further actuating member is the brake actuating member.

40. A transmission arrangement according to claim 18, characterized by further means enabling an interaction in the control of the retarder means, by means of which the maximum braking force is limited.

41. A transmission arrangement according to claim 40, characterized in that the maximum braking force is limited by said further means when releasing a gas pedal of the driving engine.

42. A transmission arrangement according to claim 40, characterized in that the maximum braking force is limited by said further means as a function of another magnitude of the driving condition.

43. A transmission arrangement according to claim 42, characterized in that said another magnitude is the driving velocity.

44. A transmission arrangement according to claim 1, characterized in that the retarder means is constructed as hydraulic brake for braking the transmission output at a relatively fixed part.

45. A transmission arrangement according to claim 1, characterized in that an additional actuating member is provided for engaging the retarder means.

46. A transmission arrangement according to claim 1, characterized in that a manually operable additional actuating means is provided for engaging the retarder means.

47. A transmission arrangement according to claim 1, characterized in that a foot-operated additional actuating means is provided for engaging the retarder means.

48. A transmission arrangement according to claim 1, characterized in that a member already present for other purposes and influencing the vehicle drive actuates the retarder means.

49. A transmission arrangement according to claim 48, characterized in that said member already present for other purposes is an actuating member.

50. A transmission arrangement according to claim 48, characterized in that said member already present for other purposes is a control member.

51. A transmission arrangement according to claim 1, characterized in that an actuating member for actuating a vehicle brake actuates the retarder means.

52. A transmission arrangement according to claim 51, characterized in that the brake actuating member is a brake pedal for a wheel brake.

53. A transmission arrangement according to claim 52, characterized by connecting means for connecting the retarder means and vehicle brake to the brake actuating member that upon actuation of the latter at first the actuation of the retarder means commences and thereupon the actuation of the vehicle brake.

54. A transmission arrangement according to claim 1, characterized in that an engine control member actuates the retarder means.

55. A transmission arrangement according to claim 54, characterized in that said engine control member is the accelerating member of the driving engine.

56. A transmission arrangement according to claim 54, characterized in that the engine control member is the gas pedal of the driving engine.

57. A transmission with a transmission output means and a retarder means arranged at the output means of the transmission, in which at least one speed of the transmission is engaged by way of a free-wheeling means, characterized by control means for the retarder means operatively connected with control means of a driving engine in such a manner that the retarder means is engaged when the engine control means drops below a position corresponding to a driving torque zero.

58. A transmission according to claim 57, characterized in that the transmission is an automatic transmission for motor vehicles.

59. A transmission according to claim 57, characterized in that the engine control means includes an actuating member having a center zero position, from which an actuation of said member in one direction effects an acceleration while an actuation of said member in the other direction effects a braking by the retarder means.

60. A transmission according to claim 59, characterized in that the member is an engine control member.

61. A transmission according to claim 59, characterized in that the member is an accelerating member.

62. A transmission according to claim 59, characterized in that the braking moment of the retarder means is controlled substantially proportional to the travel of the engine control member when the latter moves below a position corresponding to a zero driving torque.

63. A transmission with a transmission output means and a retarder means arranged at the output means of the transmission, in which at lest one speed of the transmission is engaged by way of a free-wheel means, characterized by control means for the retarder means operatively connected with control means for a driving engine in such a manner that the retarder means is engaged when the engine control means drops below a position corresponding to a driving torque zero, and characterized in that the braking amount of the retarder means is controlled in dependence on the magnitude of the rotational speed difference at the free-wheeling means of the engaged speed.

64. A transmission according to claim 63, characterized in that the rotational speed difference is determined from the input and output rotational speed of the transmission, taking into consideration the transmission ratio.

65. A transmission according to claim 59, characterized in that the braking moment of the retarder means is controllable only up to a predetermined limit value.

66. A transmission according to claim 65, characterized in that with engagement and control of the retarder means by an actuating member present already for other purposes, the braking torque of the retarder means is controllable by said actuating member above the mentioned limit value.

67. A transmission according to claim 66, characterized in that the actuating member is a control member.

68. A transmission according to claim 67, characterized in that the control member is a brake actuating member.

69. A transmission according to claim 60, characterized in that the retarder means is controlled, on the one hand, by the travel of the engine control member and on the other, by the engine rotational speed.

70. A transmission according to claim 69, characterized in that the retarder means is additionally controlled by the brake actating member.

71. A transmission with a transmission output means and a retarder means arranged at the output means of the transmission, in which at least one speed of the transmission is engaged by way of a free-wheeling means, characterized by control means for the retarder means operatively connected with control means of a driving engine in such a manner that the retarder means is engaged when the engine control means drops below a position corresponding to a driving torque zero, and characterized in that with a hydraulic unit combined with the transmission, retarder means is controlled by rotational speed comparison as a function of rotational speed difference pump and turbine wheel of the hydraulic unit.

72. A transmission according to claim 71, characterized in that the control by rotational speed comparison is an additional control.

73. A transmission according to claim 57, characterized in that the retarder means is controlled by the support member of the driving engine exerted on bearing support means.

74. A transmission according to claim 73, characterized in that the retarder means is controlled by a decreasing support moment exerted on the bearing support means.

75. A transmission according to claim 73, characterized in that the retarder means is controlled by an interruption in the support moment exerted on the bearing support means.

76. A transmission according to claim 75, characterized in that the last-mentioned control is an additional control.

77. A transmission according to claim 57, characterized in that the control of the retarder means by the engine control means takes place only up to a limited value and a further control by a further actuating member takes place for the full effect of the retarder means.

78. A transmission according to claim 77, characterized in that said further actuating member is the brake actuating member.

79. A transmission according to claim 57, characterized by further means enabling an interaction in the control of the retarder means, by means of which the maximum brake force is limited.

80. A transmission according to claim 79, characterized in that the maximum braking force is limited by said further means when releasing the gas pedal.

81. A transmission according to claim 79. characterized in that the maximum braking force is limited by said further means as a function of another magnitude of the driving condition.

82. A transmission according to claim 79, characterized in that said another magnitude is the driving velocity.

83. A transmission arrangement according to claim 1, characterized in the engine control means for controlling the driving engine are provided and are operatively connected with retarder control means, said engine control means including an accelerating member and a vehicle brake control member.

84. A transmission arrangmenet according to claim 83, characterized in that said accelerating member is a gas pedal of the driving engine and said brake control member is brake pedal for a wheel brake.

85. A transmission arrangement according to claim 84, characterized in that the control means for the retarder means includes a control valve means operatively connected with said gas pedal and said brake pedal.

86. A transmission arrangement according to claim 85, charaterized in that the control means for the retarder means further includes a speed controller means operatively connected with said control valve means for controlling the retarder means as a function of engine rotational speed.

* * * * *